United States Patent [19]

Hanley et al.

[11] Patent Number: 4,652,045
[45] Date of Patent: Mar. 24, 1987

[54] SLIDING AND VENTING SUNROOF

[75] Inventors: Martin G. Hanley, St. Peters, Mo.; James L. Gowan, Kuttawa, Ky.; Robert L. Deschamps, St. Louis, Mo.

[73] Assignee: Sky-Top Sunroofs, Ltd., St. Louis, Mo.

[21] Appl. No.: 526,787

[22] Filed: Aug. 26, 1983

[51] Int. Cl.[4] .......................... B60J 7/05; B60J 7/053; B60J 7/057; B60J 7/185
[52] U.S. Cl. .................................. 296/221; 296/222; 296/223; 296/224; 296/217; 296/216
[58] Field of Search ............................... 296/221-223, 296/216, 217, 224

[56] References Cited

U.S. PATENT DOCUMENTS

| | | | |
|---|---|---|---|
| 3,033,608 | 5/1962 | Golde | 296/217 |
| 3,329,462 | 7/1967 | Baur | 296/222 |
| 3,507,537 | 4/1970 | Kouth et al. | 296/221 |
| 3,632,160 | 1/1972 | Schlapp | 296/221 |
| 3,894,767 | 7/1975 | Schatzler | 296/221 |
| 4,039,222 | 8/1977 | Wolf et al. | 296/222 |
| 4,085,965 | 4/1978 | Schlapp | 296/221 |
| 4,142,759 | 3/1979 | Bienert | 296/217 |
| 4,260,189 | 4/1981 | Periou et al. | 296/223 |
| 4,272,122 | 6/1981 | Schlatzler | 296/221 |
| 4,272,125 | 6/1981 | Bienert et al. | 296/223 |
| 4,364,601 | 12/1982 | Katayama et al. | 296/221 |
| 4,379,586 | 4/1983 | Kaltz et al. | 296/222 |
| 4,420,184 | 12/1983 | Kaltz | 296/222 |

FOREIGN PATENT DOCUMENTS 1090528 10/1954 France ................... 296/221
2286018 4/1976 France ................... 296/223

Primary Examiner—Robert B. Reeves
Assistant Examiner—Dennis H. Pedder
Attorney, Agent, or Firm—Sandler & Greenblum

[57] ABSTRACT

A sliding sunroof including a cover, a device for moving the cover forward and rearward, a device for lifting the rear of the cover upward from an open position to a closed position and further upward to a vented position, devices for locking the cover in these positions, and a rear cover support. The lifting device includes a ramp for lifting the cover into the open position and a rack and pinion gear combination for lifting the cover into the vented position. The lifting device is attached to the rear cover support and includes a ramp guide and a lift arm slidably engaging a slot in the ramp guide. The ramp guide also includes a ramp at its forward end, and rack gear teeth positioned adjacent the slot. The lift arm includes a mechanism for pivotally attaching the arm to the cover at the forward end of the lift arm, an element for riding up the ramp, an element for sliding within the slot of the ramp guide, and pinion gear teeth on the rear end of the arm which are adapted to mesh with the rack gear teeth on the ramp guide.

37 Claims, 37 Drawing Figures

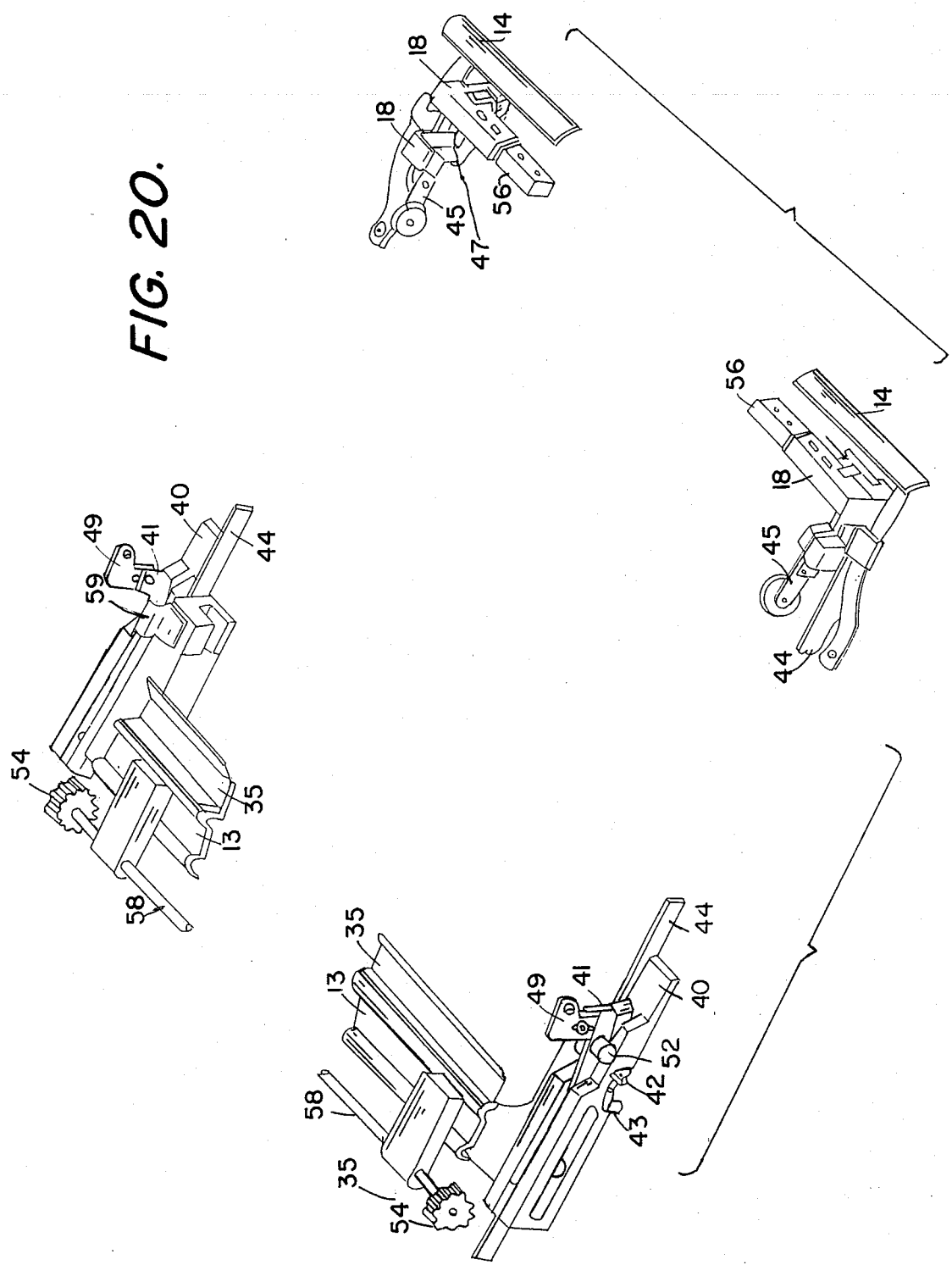

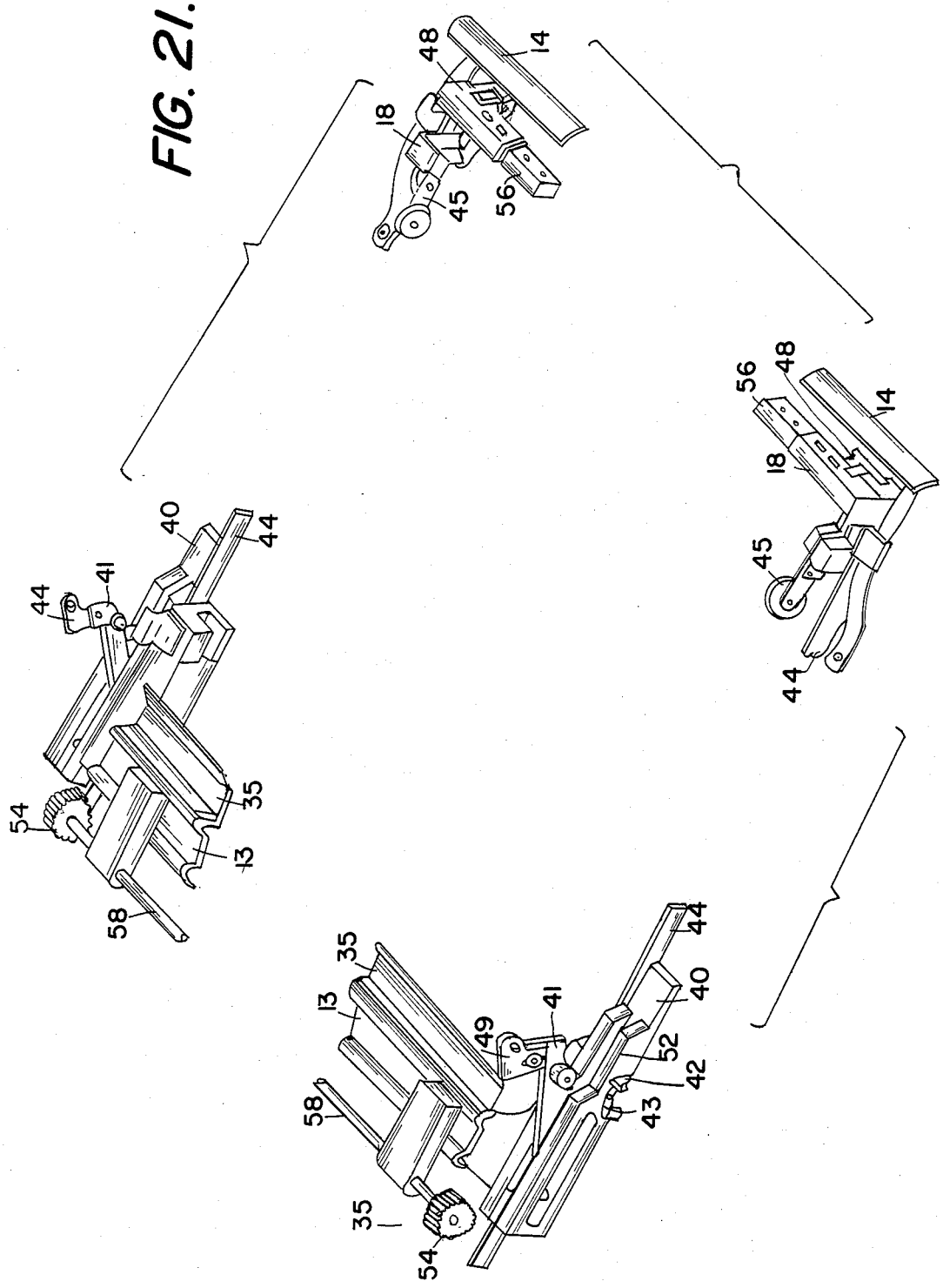

FIG. 33.
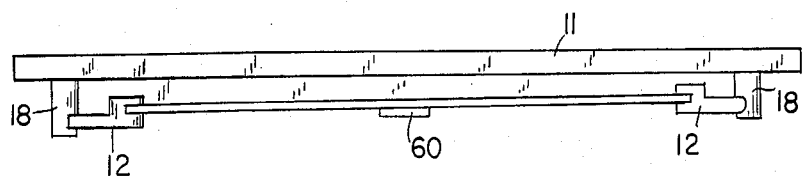
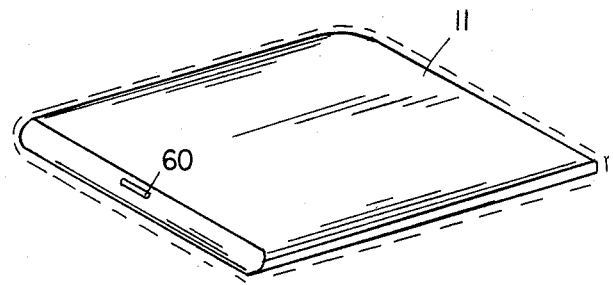
FIG. 34.
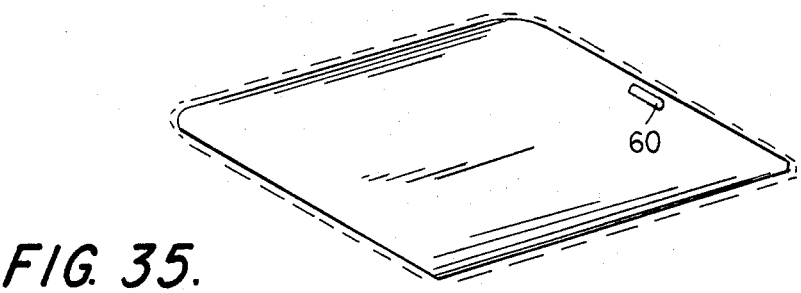
FIG. 35.

SLIDING AND VENTING SUNROOF

FIELD OF THE INVENTION

The present invention relates to an improvement in a sliding sunroof for a vehicle having an opening in the roof thereof comprising:
(1) a housing,
(2) a sunroof cover, and
(3) means for moving forward and rearward;
(4) means for moving the rear of the sunroof cover upward to a closed position and further upward to a vent position, and downwardly in the reverse direction in response to movement of the forward and rearward moving means; and
(5) means for securely locking said sunroof in these positions.

The present invention relates more particularly to a translucent or transparent sliding sunroof having a rigid sliding and venting cover for an opening in the roof of a vehicle to permit a maximum viewing area from inside the vehicle when the cover is in its closed position and to provide minimum loss of headroom under the roof of the vehicle.

The present invention also relates to a translucent or transparent sliding and venting cover for a vehicle roof opening having minimal framing and whose front points of attachment and positioning control are an integral part of a front frame member and are readily adjustable and serviceable with the cover in place. As a result there is no need to hide the front points of attachment or positioning control in a full or partial decorative internal frame.

The present invention has the advantages of U.S. Pat. No. 4,039,222. It also provides space within its thin envelope for a sliding sunshade which operates independently of the sliding cover in the forward (closing) direction, but which is carried automatically rearward by the sliding cover when it is opened. The present invention also provides an automatically operating wind deflector.

DESCRIPTION OF THE PRIOR ART

Sliding roof covers constructed of glass with the capability to both slide open and move upward into a venting position, as heretofore known, comprised mechanisms which required peripheral cable drive systems. Such mechanisms have inherent disadvantages that include a likelihood of becoming unbalanced so that the moving panel is no longer positioned or stressed evenly on both sides. They also suffer from an inability to reliably remain locked in the flush closed position against both downward (inward) as well as upward (outward) pressures generated, for example by slamming a car door which compresses the interior air. Further, they have attachment means and mechanical means that are positioned so that they require the use of a decorative frame on the underside of the glass cover to hide said attachment means or mechanical means. These known sliding roof covers are described in U.S. Pat. No. 4,085,965—Schlapp, U.S. Pat. No. 4,364,601—Katazama, and U.S. Pat. No. 4,379,586—Kaltz.

In another known arrangement, a translucent cover has been combined with a sliding frame, whereby the cover lifts from the frame into a venting position and the frame drops down and rearward to provide an open position for the cover. This arrangement is also based on a dual cable mechanism, and the cover/frame combination has the disadvantage of increasing the thickness of the cover and reducing the effective translucent opening and again requiring a decorative trim frame as described in U.S. Pat. No. 4,342,482—Koral.

Thus, in converting sliding glass covers to a slide/vent mode, or converting slide/vent metal covers to glass, means heretofore known have either sacrificed viewing area, vehicle headroom, or both.

The present invention relates to a sliding and venting sunroof. The present invention also relates to a sliding and venting sunroof that allows viewing through the maximum width of a translucent cover while intruding into the vehicle's headroom no more than many metal sliding roofs heretofore known, such as U.S. Pat. No. 4,039,222 which describes the thinnest envelope translucent panel power sunroof presently available.

The present invention also relates to a positive locking control for locking the sliding/venting cover in all positions—vent, closed, or open—but particularly to a positive locking means for locking the cover in both the up and down direction at the rear of the cover when the cover is in a closed position flush with the vehicle roof.

SUMMARY OF THE INVENTION

This invention achieves its advantages by the following major features:

1. By using a power bar (cross member) the glass cover operates with minimum visibility of the operating means in the open, closed or vent positions. The power bar is separate from and rearward of the glass cover and is driven by a moving means positioned at the center of the power bar in the preferred embodiment. This moving means may be a screw shaft, a tape mechanism, or a flexible cable. It is within the scope of the invention to attach the power bar at its outboard ends to a pair of cables for effecting movement.

2. By adding a water trough to the front of the power bar so that the trough is beneath the rear cover seal when the cover is in its closed position the apparatus catches any water passing this seal.

3. By incorporating a lifting mechanism that includes a movable ramp that lifts the panel toward its closed (sealed) position, and a lifting arm that carries the cover into its vent position, the lifting arm can incorporate a pinion gear at its lower end to lock into a rack to secure the cover in its vent position.

4. By using a laterally operating spring loaded locking pin which secures the cover in its open position rattles are prevented and premature lift as the operating means carries the cover first rearward and then forward toward its closed position is prevented. A lateral ramp in the housing can be provided for interacting with the locking pin to disengage it to permit cover closure.

5. The same laterally operating spring loaded locking pin can be used to secure a span bar to the ramp housing so that the distance between a front glider and a rear glider is controlled while the cover is in the open position, further contributing to the positive lock control the of cover by the operating means.

6. By providing a cylindrical tab on the lift arm which interacts with the locking tab on the rear glider positive and rattle-free locking of the cover in its closed position is provided when the cover is, flush with the vehicle roof, subject to either downward or upward pressure on the cover.

7. The front adjusting bar described in U.S. Pat. No. 4,039,222 has been improved and reduced to two front pivot rods (left and right) each attached to two front pivot blocks that provide attachment means for the front gliders, and adjustment means in both horizontal and vertical directions between the cover and the front gliders. The adjustment means remain easily accessible yet are even less obtrusive than previously and require no decorative trim.

8. By providing a spring loaded catch arm pivotally attached to the front cover support and interacting with a catch bracket to prevent rearward movement of the cover while in the vent position, jamming of the mechanism and possible damage to the cover and the vehicle roof paint are avoided.

9. By using both vertical and horizontal adjustment means which have been incorporated in the adjusting arm that connects the lift arm to the rear of the cover, these means are located in a non-obtrusive manner outboard of the normal viewing area so as to require no interior trim.

10. The present invention uses two pinion gears, connected by an alignment axle and attached to the power bar, that engage with an alignment rack during the close/vent/open positions of the cover thereby preventing the power bar from allowing the cover to become out of alignment with the tracks (guide rails).

In one embodiment, the present invention relates to a sliding sunroof for a vehicle having an opening in the roof thereof. The sunroof comprises a housing, a sunroof cover, means for moving forward and rearward, means for moving the rear of the sunroof cover upward from an open position to a closed position and further upward to a vent position, and downwardly in the reverse direction, and means for securely looking the sunroof in these positions.

The sunroof further comprises a lifting mechanism. In this embodiment, the rear of the sunroof cover is attached to the lifting mechanism. In addition, the lifting mechanism comprises a ramp for lifting the cover into a level closed position and a rack and pinion gear combination for lifting the rear of the sunroof cover upward into the vent position in response to forward movement of the sunroof cover.

The sunroof further comprises a rear cover support means for supporting the rear portion of the cover. In this embodiment, the lifting mechanism is attached to this rear cover support means. In addition, the lifting mechanism further comprises a ramp guide and a lift arm. The ramp guide comprises a forward end comprising a ramp portion, a slot having a rear portion, and rack gear teeth positioned at the rear portion of the slot. The lift arm is slidably encaptured in the slot of the ramp guide. In addition, in this embodiment the arm comprises means for pivotally attaching the arm to the cover at the forward end of the lift arm, means positioned for riding up the ramp portion of the ramp guide, means for sliding within the slot of the ramp guide, and pinion gear teeth on the rear of the arm to mesh with the rack gear teeth on the ramp guide.

The rear cover support means-lifting mechanism combination can further comprise a horizontal locking tab that prevents the riding means on the lift arm from upward movement while the riding means is riding on top of the ramp portion of the ramp guide thus creating a positive locking means for preventing any vertical movement of the cover while the cover is in the closed position. In addition, the sunroof can further comprise a positive lock for preventing the cover from being displaced from the vent position. Also, the pinion gear teeth engaging the rack gear teeth can comprise means for positively locking the cover from the closed to the vent position. In addition, the pivotally attaching means can comprise means for adjusting the length of the pivotally attaching means thereby providing a vertical adjustment of the rear of the cover to allow proper position for the cover in the closed position. Also, the forward portion of the lift arm can further comprise means for horizontally adjusting the cover in the vent position to allow proper venting and closing of the cover.

In still another embodiment, the lifting mechanism can further comprise means for locking the lift arm to the ramp guide to prevent the cover from lifting in the open position. In this embodiment, the locking means prevents the lift arm from moving in relation to the ramp guide until the locking means is disengaged prior to the cover moving into the closed position.

In still another embodiment, the sunroof further comprises front cover support means, a plurality of guide rails for guiding the means for moving the cover, a longitudinal bar disposed parallel to the rail guides, and a longitudinal bar locking means. In this embodiment, the rear cover support means-lifting mechanism combination is slidably attached to the front cover support means by means of the longitudinal bar. In addition, the longitudinal bar locking means prevents the longitudinal bar from moving in relation to the rear cover support means-lifting mechanism combination when engaged therein. Also, the longitudinal bar locking means is disengaged from the rear cover support means-lifting mechanism combination prior to the cover moving from the open to the closed position.

In addition, the longitudinal bar locking means can lock the longitudinal bar to the ramp guide. Also, the locking means for locking the lift arm to the ramp guide and the locking means for locking the longitudinal bar to the ramp guide can be incorporated into the same locking means.

In still another embodiment, the vehicle sunroof can further comprise a bracket, front cover support means for supporting the front of the cover, and means for locking the cover in the vent position to prevent the cover from rearward movement in the vent position. In this embodiment, the locking means comprises a member that is pivotably attached to the front cover support means such that when the cover is in the open position, the cover depresses one end of this member. Also, when the cover is moved into the vent position, the other end of this member rotates downward into the bracket thus creating a positive locking means preventing the cover from moving rearward while in the vent position.

In still another embodiment, the sunroof further comprises a plurality of connecting bars and a front cover support means for supporting the front of the cover. In this embodiment, the front cover support means is attached to the cover by means of the connecting bars which are rotatably attached thereto, thus allowing the cover to rotate about the front cover support means. In addition, in this embodiment, the connecting bars comprise means for the horizontal and vertical adjustment of the cover thereby allowing for proper positioning of the cover. In still another embodiment, the cover forms a seal with the opening when the cover is in the closed position. Also, the sunroof in this embodiment further comprises a water trough positioned directly underneath the seal between the cover and the roof opening when the cover is in the closed position.

In still another embodiment, the vehicle sunroof further comprises an electric motor, a gear box attached to the electric motor, and a first switch. In this embodiment, the means for moving the sunroof cover is driven by the electric motor and gear box. Also, the first switch senses when the cover is in the closed position and shuts off the motor. In addition, the vehicle sunroof can further comprise a second switch for sensing when the cover is in a full vent position and for shutting off the motor. This second switch subsequently permits the motor to move only in the direction that would close the cover.

In an alternative embodiment, the vehicle sunroof can instead comprise a first stop means for engaging the cover to prevent movement of the sunroof cover when the sunroof cover is in a closed position and means for disengaging the cover from the stop means to permit the cover to move into the vent position. Also, in still another alternative embodiment, a second stop can be provided for preventing movement of the cover in the vent position.

In still another embodiment, the invention comprises a sliding sunroof for a vehicle having an opening in the roof thereof. In this embodiment, the sliding sunroof comprises a housing, a moveable sunroof cover, a rear cover support means, a moveable cross-member, means for moving the cover forward and rearward, and a lifting mechanism. The housing comprises a plurality of guide rails longitudinally positioned along the outer edges of an opening in the housing. The rear cover support means supports the rear of the cover and is slidably attached to the guide rails and is adapted to effect opened, closed, and vented positions of the cover in the roof opening. The means for moving the cover forward and rearward is applied to the rear of the housing to the cover through the movable cross-member. The movable cross-member is separated from and rearward of the cover and is attached to the rear cover support means. In addition, the moving means is attached to the movable cross-member, the rear cover support means is attached to the cover through the lifting mechanism, and the lifting mechanism is adapted to lift the cover into a closed position level with the roof opening and into a vent position above the roof opening.

In addition, the rear of the sunroof cover can be attached to the lifting mechanism. In this embodiment, the lifting mechanism comprises a ramp for the lifting the cover into a level of closed position and a rack and pinion gear combination for lifting the rear of the sunroof cover upward into a vent position. In addition, the cover can form a seal with the roof opening when the cover is in the closed position. In this embodiment, the sunroof cover further comprises a water trough attached to the front of the moveable cross member such as the water trough is positioned directly underneath the shield between the cover and the roof opening when the cover is in the closed position.

In still another embodiment, the invention further comprises a sun shade and a wind deflector. The sun shade is slideably attached to the guide rails and is adapted to effect open and close positions positioned underneath the sunroof cover. The wind deflector is positioned at the front of the housing such that the wind deflector is contained within the housing when the cover is in the closed position. In addition, the wind deflector is adapted to move upward when the cover is in the open position to deflect the wind over the top of the roof opening and to prevent wind noise and interior air turbulance and drafts. In this embodiment, the rear cover support means comprises a component having a top horizontal face and side vertical face. The vertical face comprises means for attaching the rear cover support means to the lifting mechanism.

In still another embodiment, the invention comprises a vehicle sunroof. This sunroof comprises a sunroof cover, and means for maintaining the cover in a squarely aligned position. This alignment means comprises a plurality of guide rails, a moveable cross member, rack gear teeth, and a pair of pinion gears. The pair of pinion gears are fixedly attached to each other. Also, each pinion gear is rotatably attached to the rear of the moveable cross member. Also the pair of pinion gears mesh with the rack gear teeth. These rack gear teeth are fixedly attached to the top of the guide rails.

While the preferred embodiment of the invention has been set forth hereinabove, it is not intended to limit the invention solely thereto, but to include all of the variations and modifications within the scope and spirit of the invention. As an example one may vary the single element drive means among several well known in the trade, or apply a known dual cable system to either front or rear; one may also replace the translucent or transparent panel with a metal or plastic panel and permanently attach the sunshade thereunder in a known fashion. DR

BRIEF DESCRIPTION OF THE DRAWINGS

FIG. 20 is a perspective view of a portion of the present invention in the closed position;

FIG. 21 is a perspective view of a portion of the present invention in the vent position;

FIG. 33 is a front view showing the sunshade riding on the tracks;

FIGS. 34 and 35 are perspective views of cover 11 and sunshade 60 from a point inside the automobile upon which the present invention is installed in which sunshade 60 is in the open position and the closed position, respectively;

Figure 1:
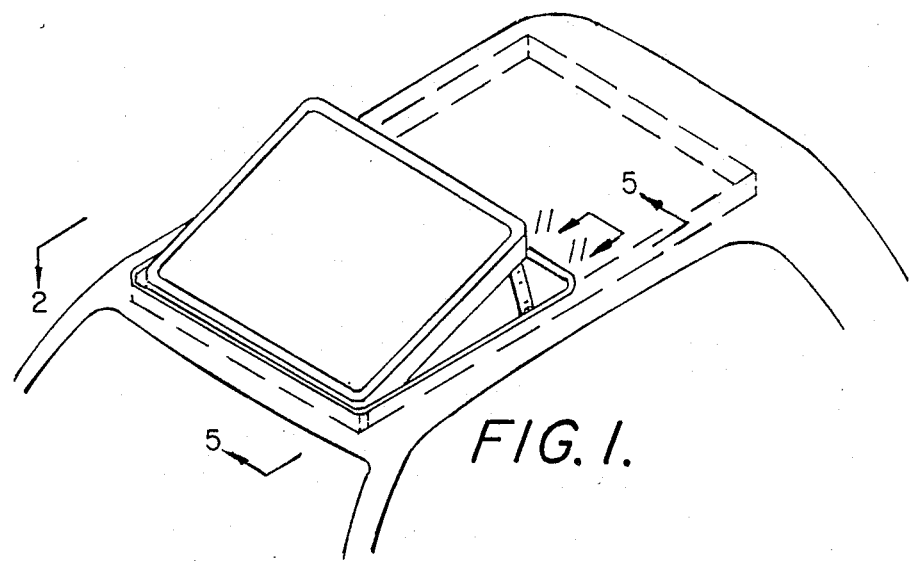
FIG. 1 is a perspective view of a vehicle having a sliding roof assembly in the vent position constructed according to the teachings of this invention mounted therein.
Figure 2:
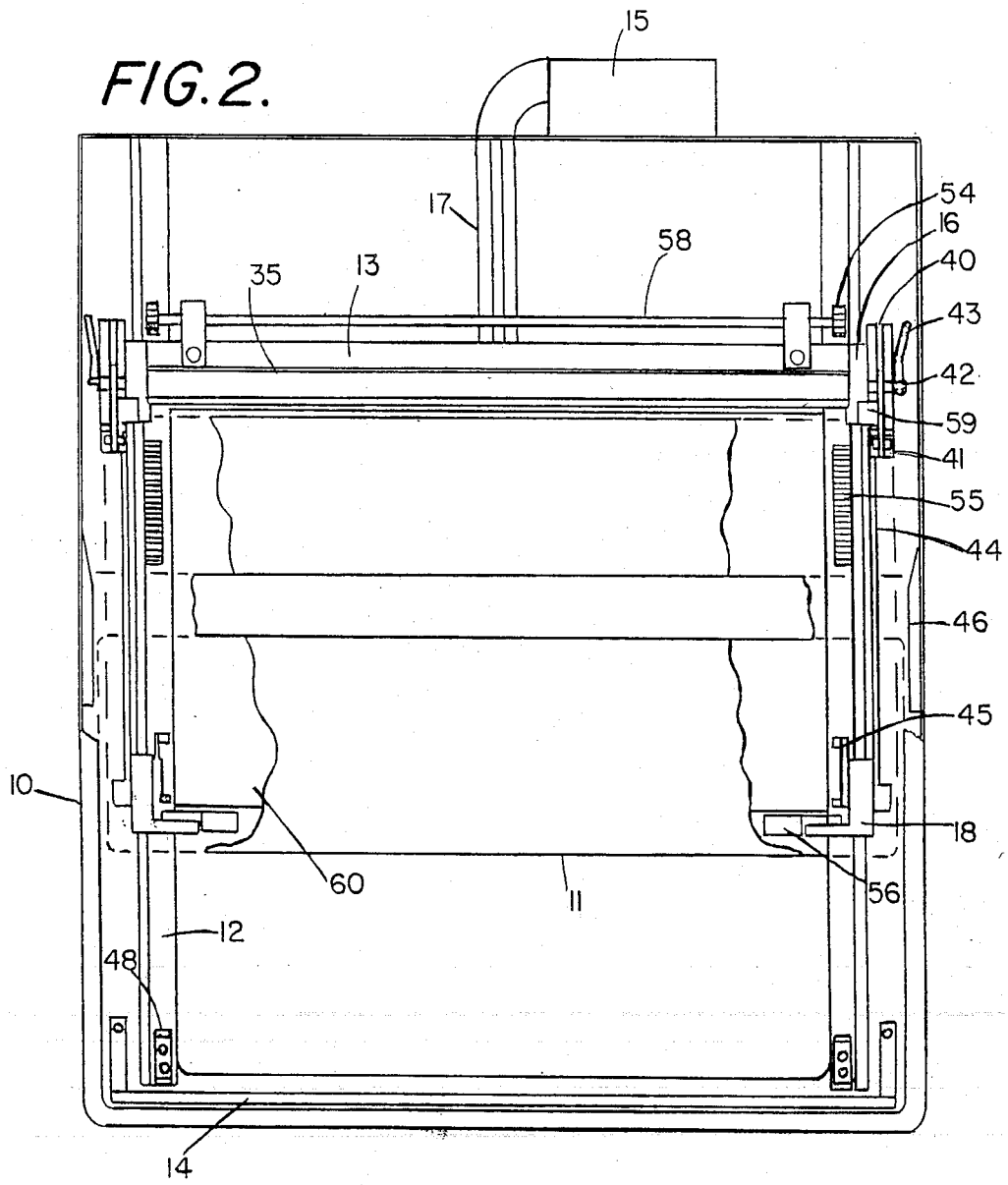
FIG. 2 is a top view showing the assembled sunroof kit.

COMPONENT LIST 10 sunroof housing
11 roof panel (glass)
12 track
13 power bar (cross member)
14 wind deflector assembly
15 motor and gearbox assembly or manual handcrank (would be repositioned)
16 rear glider
17 drive mechanism (cable, leadscrew or tape)
18 front glider (front cover support)
35 water trough (attached to front of power bar)
40 ramp guide (attached to rear glider and allows lift arm to slide within it)
41 lift arm (one end slides in ramp guide and other end is attached to roof panel)
42 lock pin
43 lock arm (operates lock pin)
44 span bar (attached to front glider and slides within ramp guide)
45 catch arm (pivotally attached to span bar)
46 side ramp (attached to side of housing)
47 catch bracket (combined with front stop)
48 front stop (attached to track)
49 adjust arm (attached to lift arm)
50 opening in lift arm for lock pin
51 bolt (for lateral adjustment of roof panel)
52 cylindrical tab (attached to lift arm)
53 bracket (attached to ramp guide on which the lock arm that operates the lock pin pivots)
54 rear pinion gear
55 alignment rack
56 front pivot block
57 front pivot rod
58 alignment axle
59 locking tab
60 sunshade
62 spring
64 biasing means;

DESCRIPTION OF THE PREFERRED EMBODIMENTS

Figure 3:
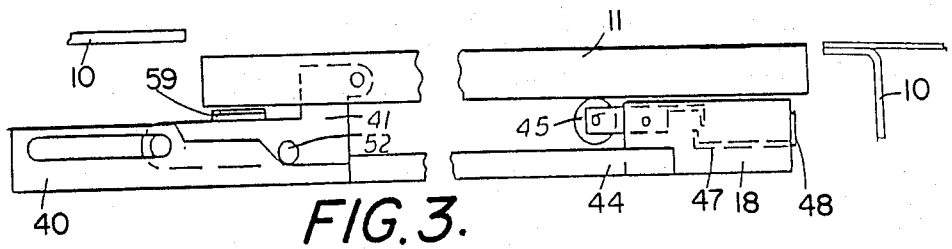
FIG. 3 is a side view showing the roof panel in an open position.
Figure 4:
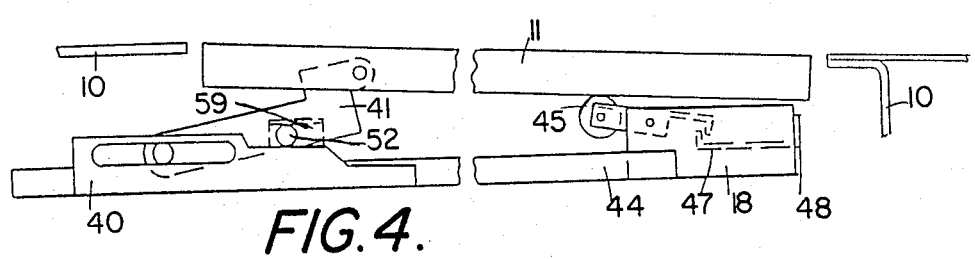
FIG. 4 is a side view showing the roof panel in the closed position.
Figure 5:
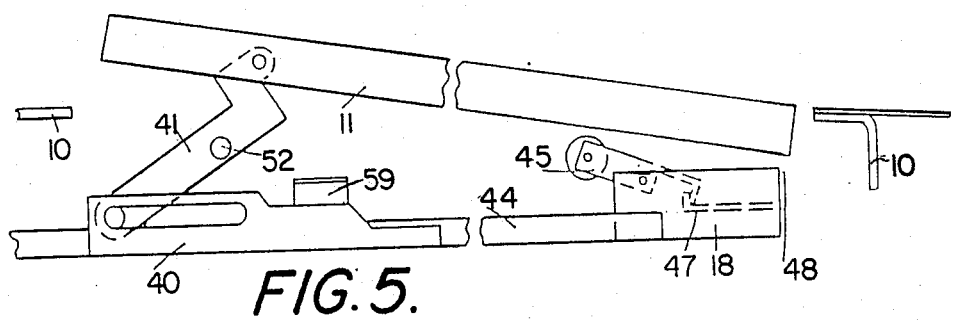
FIG. 5 is a side view showing the roof panel in the vent position.
Figure 6:
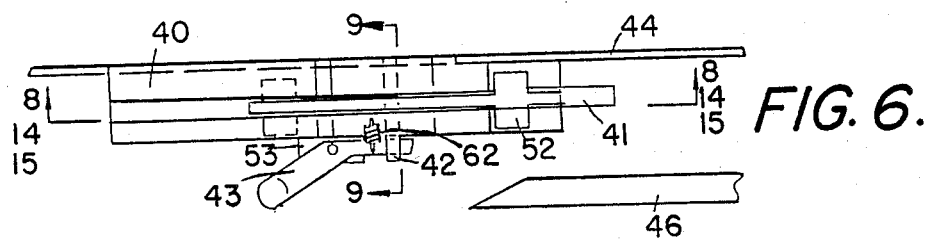
FIG. 6 is a top view of the lifting mechanism showing the lock engaged.

The present invention comprises a sliding sunroof for a vehicle having an opening therein. The sunroof comprises a sunroof housing 10 which houses a roof panel 11. The rear of roof panel 11 can be positioned in three positions: an open position, which is its bottommost position and is illustrated in FIG. 3, a closed position, in which the rear of panel 11 is raised with respect to the open position, and which is illustrated in FIG. 4, and a vent position in which panel 11 is raised to an even higher position than the closed position, which is illustrated in FIG. 5.

Figure 13:
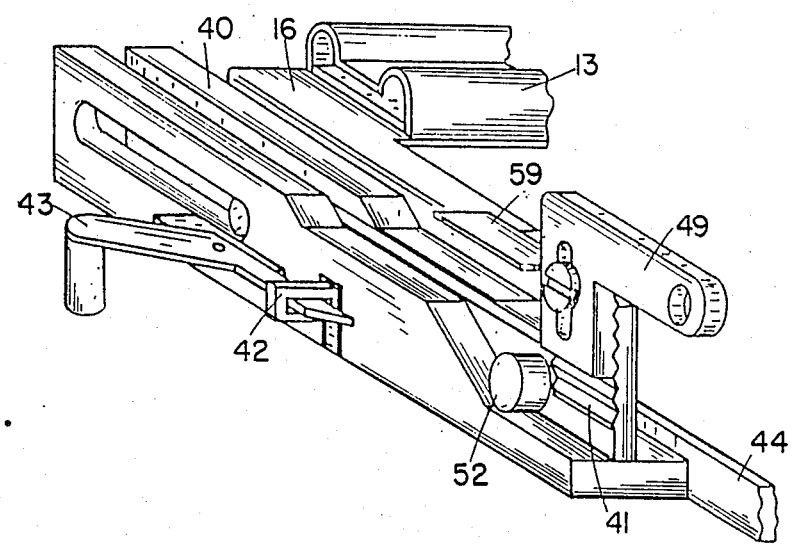
FIG. 13 is a perspective view of the lifting mechanism.

The sunroof also comprises a drive means 17, seen in FIG. 1, which will be described in more detail below, which drives a crossbar 13 forward and rearward. Crossbar 13 is connected to rear glider 16 as seen in FIG. 13.

Figure 26:
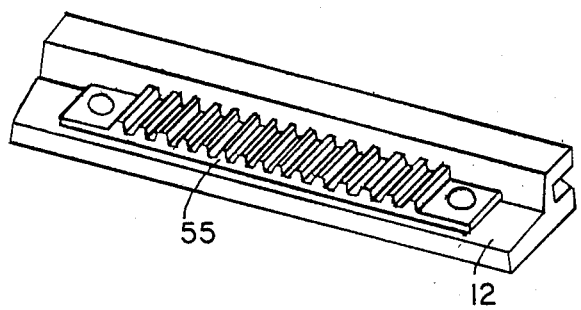
FIG. 26 is a perspective view of the alignment rack.

Rear glider 16 is connected to an assembly of elements, including roof panel 11, that are displaced forwardly and rearwardly in housing 10 by glider 16 and cross bar 13. In order to maintain the forward and rearward direction of travel of glider 16 and assembly, cross bar 13 is attached to alignment axle 58. A pinion 54 is attached at each end of alignment axle 58, and pinion 54 engages a rack 55 on track 12 of housing 10 as illustrated in FIG. 26.

As illustrated in FIGS. 13, and 19-21, rear glider 16 is attached to ramp guide 40. Ramp guide 40 has two slots therein which are adapted to engage a portion of a lift arm 41, as illustrated in FIGS. 3-5. The top of lift arm 41 is attached to panel 11 by adjustment arm 49 and a bracket mounted on a bolt 51 at the top of arm 49, illustrated in FIG. 11. As a result of this arrangement, rear glider 16 supports the rear end of panel 11.

The front of panel 11 is supported by a front glider 18. Front glider 18 is connected to the front of panel 11 by front pivot blocks 56. Front glider 18 is also connected to rear glider 16 via span bar 44 and via panel 11. Span bar 44 is slidingly attached to rear glider 16.

Figure 15:
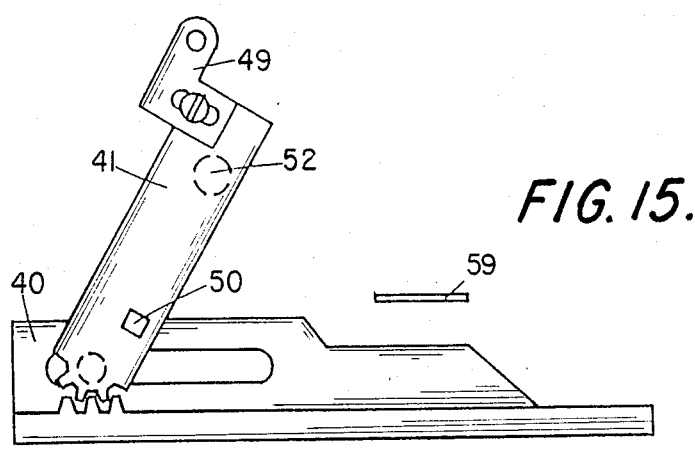
FIG. 15 is a cross-sectional view showing the pinion gear teeth of the lift arm meshing with the rack gear teeth of the ramp guide.
Figure 16:
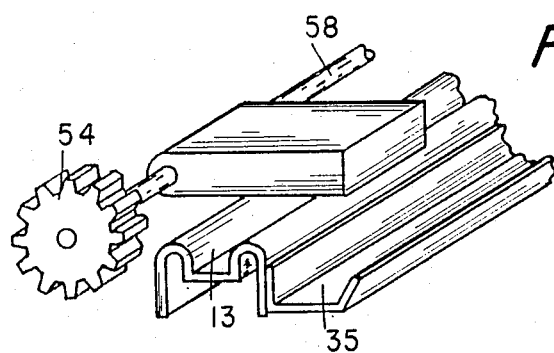
FIG. 16 is a perspective view showing the rear pinion gear and axle attached to the power bar.
Figure 18:
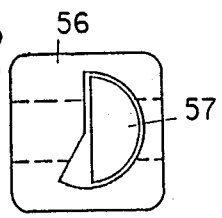
FIG. 18 is a side view of the front pivot.
Figure 17:
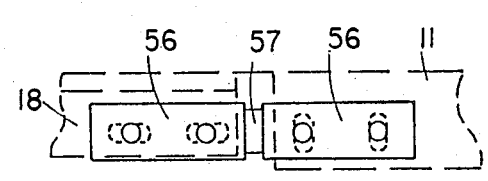
FIG. 17 is a front view of the front pivot.
Figure 19:
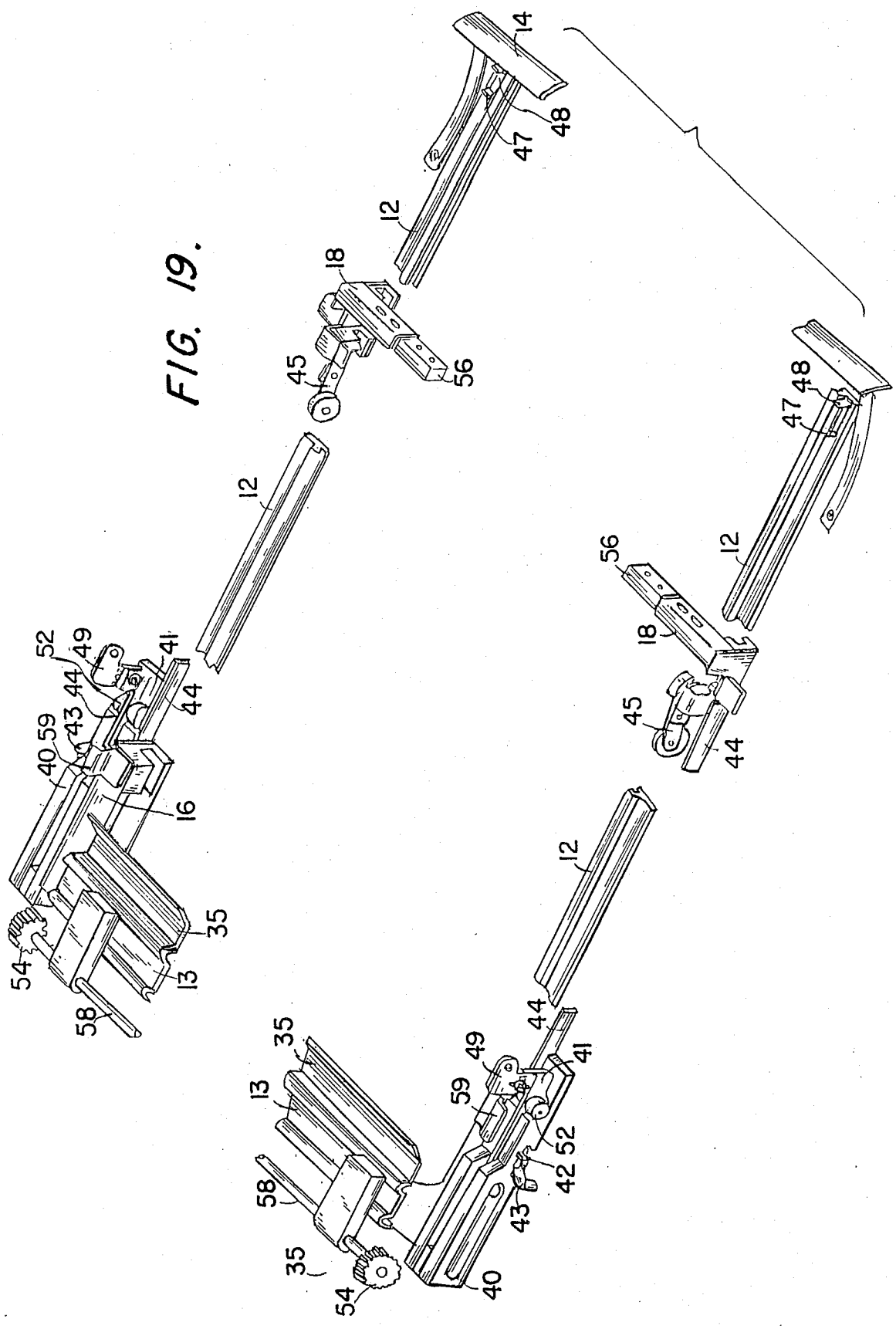
FIG. 19 is a perspective view of a portion of the present invention in the open position.
Figure 24:
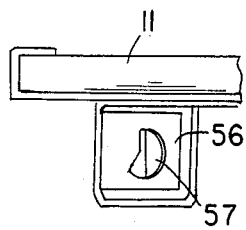
FIGS. 24 and 25 are side cross-sectional views of the front pivot block and rod in two different positions.
Figure 25:
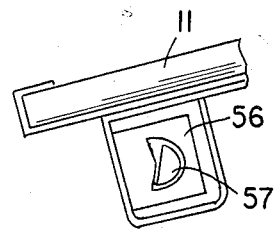

In the open position illustrated in FIGS. 3 and 19, the rear portion of panel 11 is positioned below housing 10 and the front of panel 11 and front glider 18 are spaced from the front of the housing. When the apparatus is activated, cross bar 13 is displaced in the forward direction, thereby displacing guide 40, arm 41, a panel 11 and front glider 18 forwardly, as illustrated in FIG. 20. At some point during the forward movement of front glider 18 and panel 11, these elements contact the front of housing 10 and stop. As a result, lift arm 41 also halts its forward movement because it is attached to panel 11. However, guide 40 continues moving forward. This forward movement guide 40 is possible because guide 40 and lift arm 41 are not rigidly attached by rather are slidingly attached; a portion of arm 41 slides in a slot in guide 40 as illustrated in FIGS. 3 and 4 when guide 40 continues to move forward. As will be explained in more detail below, this relative movement between lift arm 41 and ramp guide 40 causes a tab 52 on arm 41 to ride up a ramp on ramp guide 40, thereby lifting the rear of panel 11 into the closed position flush with housing 10 as illustrated in FIGS. 4 and 20. Further forward movement of ramp guide 40 moves ramp gear teeth attached to ramp guide 40 into contact with pinion gear teeth on lift arm 41, thereby raising lift arm 41 and the rear of roof panel 11 even higher into a vented position as illustrated in FIGS. 5, 15 and 21.

As seen in FIGS. 3–7, 13, 19–21, and 27–29, the Power Vent mechanism comprises a ramp guide 40, which is attached to the outboard side of the rear glider 16. Glider 16 acts as a means for supporting panel 11 and is slidingly attached to tracks 12. Ramp guide 40 encloses a lift arm 41 which is allowed to slide forward and rearward within slots located on both sides of the ramp guide 40 so as to comprise means for sliding within the slots. Lift arm 41 slides within the ramp guide 40 on one end while the other end is pivotally attached to the roof panel 11. Lift arm 41 also has a cylindrical tab 52 on both sides which rides on the ramp portion of the ramp guide 40 and an opening 50 to accept the lock pin 42. Also provided is a spring 62 for biasing lock pin 42 into the position illustrated in FIG. 6. Ramp guide 40 also has a bracket 53 to which a lock arm 43 is pivotally attached. Lock arm 43 operates the lock pin 42 by pulling it inboard and outboard. Lock pin 42 slides within a slot in the ramp guide 40 and engages the lift arm 41 and the span bar 44. Span bar 44 is disposed parallel to tracks 12, slides forward and rearward within a slot in the ramp guide 40 and is fixedly attached to the front glider 18. A catch arm 45 is pivotally attached to the front glider 18 and rotates downward via the bias from a biasing means 64 is caught by the catch bracket 47. Two front pivot blocks 56, one attached to the front glider 18 and one attached to the roof panel 11 on either side thereof, rotate about the front pivot bar 57 as seen in FIGS. 17, 18, and 22–25. An alignment axle 58 is attached to the rear of the power bar 13 with rear pinion gears 54 attached at either end which engage the alignment racks 55 attached to the tracks 12 as seen in FIGS. 19–21, and 26.

Figure 31:
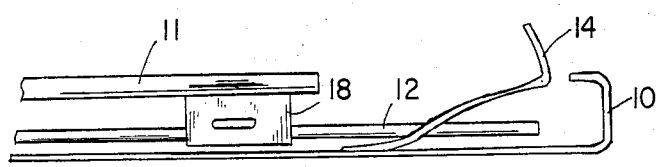
FIGS. 31 and 32 are schematic side views of the deflector when the roof is in the open and closed positions, respectively.
Figure 32:
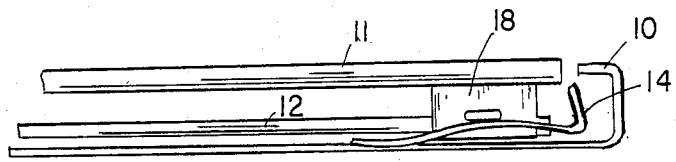
Figure 36:
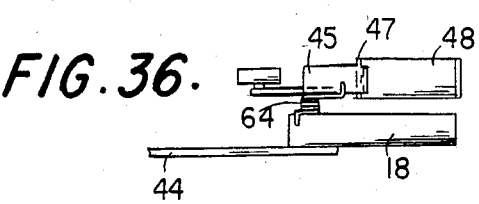
FIG. 36 illustrates a plan view of the catch mechanism of the present invention.
Figure 37:
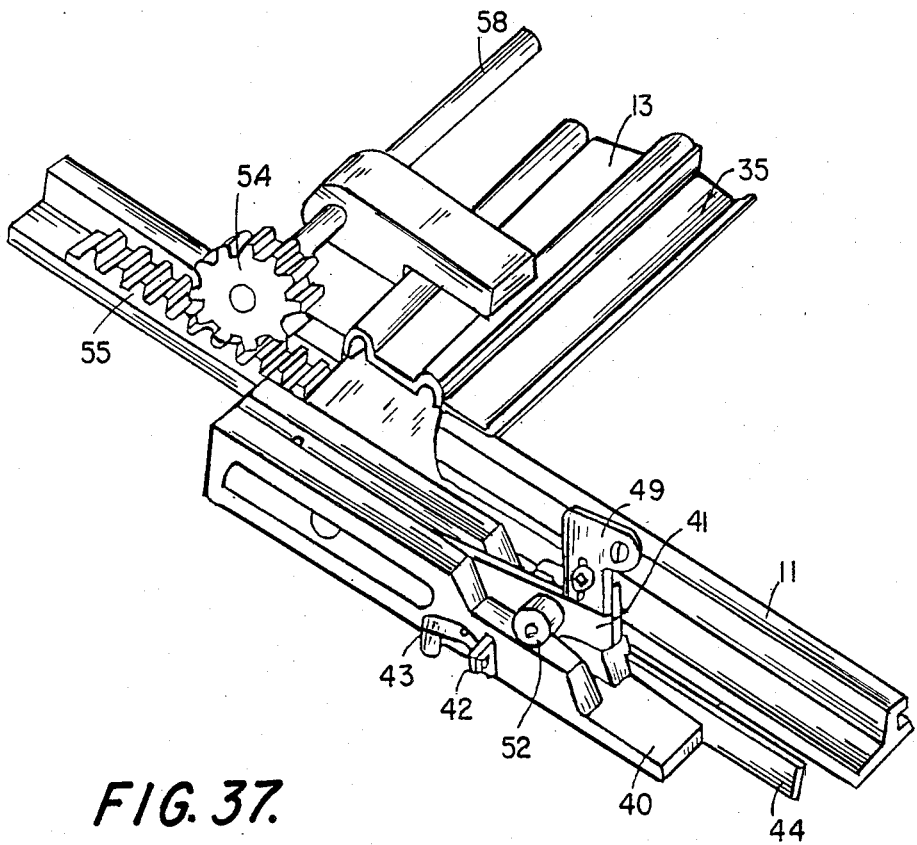
FIG. 37 illustrates a perspective view of gear 54 engaging rack 55.

In addition a deflector 14 and sunshade 30 are provided which are adapted to be displaced between open and closed positions as seen in FIGS. 31, 32; and 34, 35, respectively.

Deflector 14 is positioned at the front of housing 10 such that it is contained within the housing when the cover is in the closed position and deflector 14 moves upward when panel 11 is in the open position as seen in FIGS. 31 and 32.

Sunshade 30 is slidably attached to guide rails 12 as seen in FIG. 33.

Also, a water trough 35 is provided and is positioned directly underneath the seal between panel 11 and the housing opening when panel 11 is in the closed position.

Figure 7:
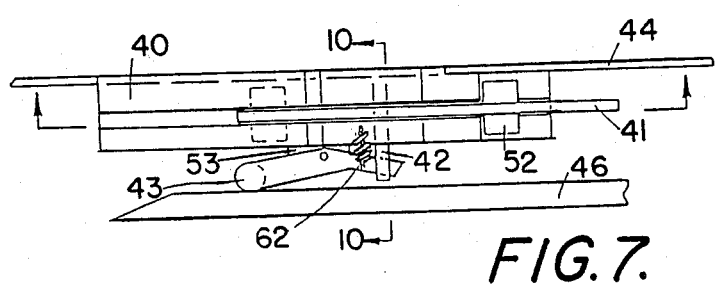
FIG. 7 is a top view of the lifting mechanism showing the lock disengaged.
Figure 8:
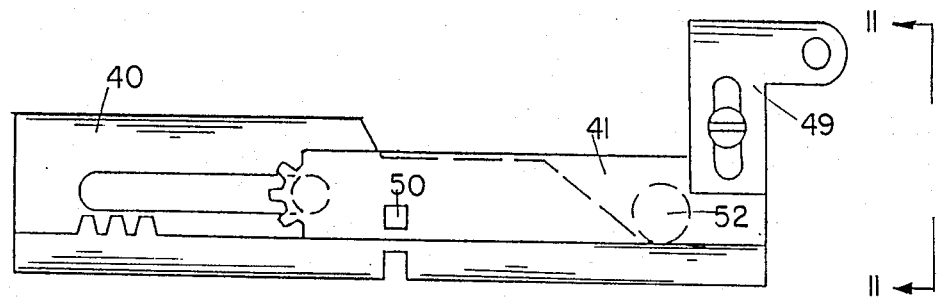
FIG. 8 is a cross-sectional view taken along line 8—8 in FIG. 7 showing the gear teeth on the lift arm and ramp guide.
Figure 9:
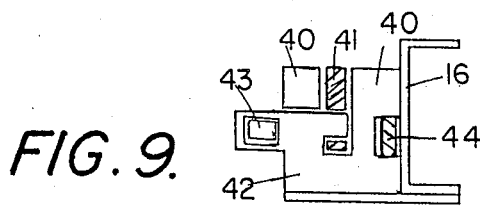
FIG. 9 is a cross-sectional view taken along line 9—9 in FIG. 6 showing the lock engaged.
Figure 10:
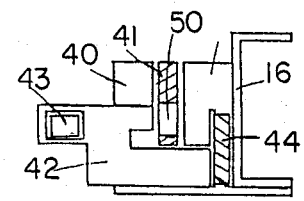
FIG. 10 is a cross-sectional view taken along line 10—10 in FIG. 7 showing the lock disengaged.
Figure 11:
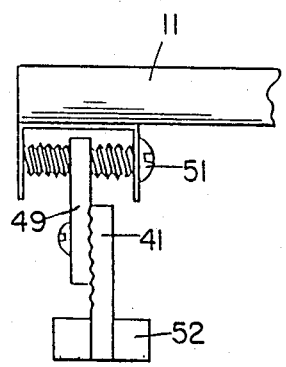
FIG. 11 is a front view showing the vertical height adjustment means at the rear of the roof panel.
Figure 12:
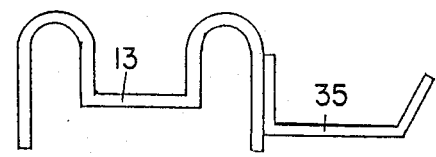
FIG. 12 is a cross-sectional view showing the power bar and water trough.
Figures 27, 28:
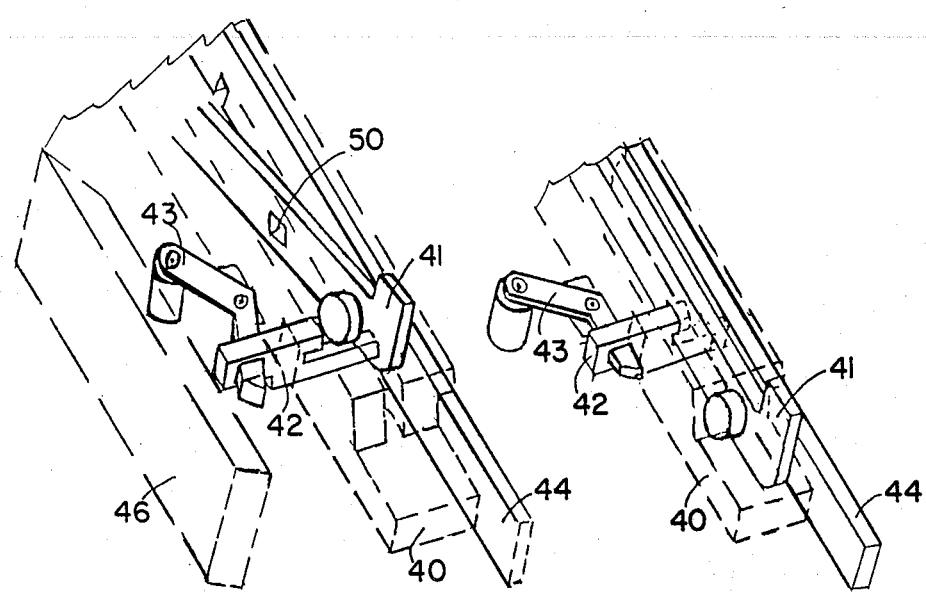
FIGS. 27 and 28 are perspective views of the locking mechanism for locking the lift arm and the span bar in the locked and unlocked positions, respectively.
Figure 29:
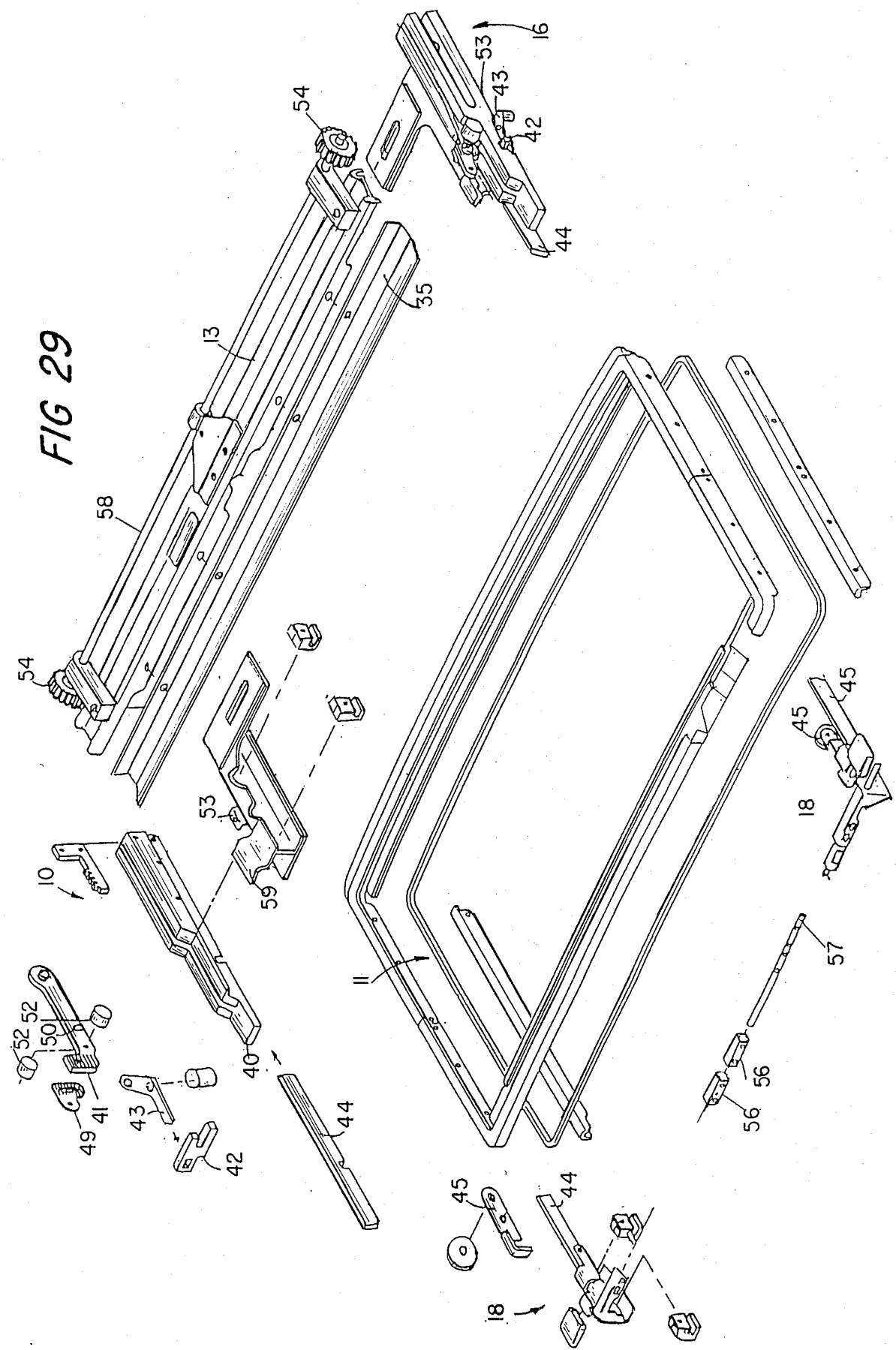
FIG. 29 is a perspective, exploded view of the present invention.
Figure 30:
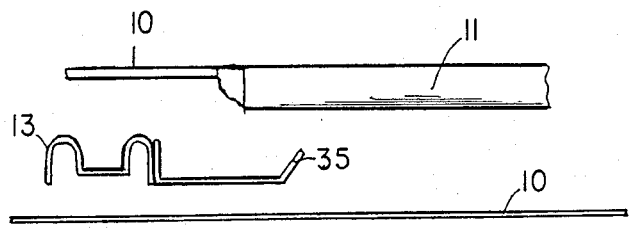
FIG. 30 is a schematic side view of the water trough positioned beneath the seal of the panel when the panel is in its closed position.

In explaining the operation of the Power Vent, it will be assumed that the roof panel 11 is in the fully open position, or fully retracted within the housing 10 underneath the vehicle roof. In the open position, the relationship of the roof panel 11 to the lift arm 41 is as shown in FIG. 3 and the rear end of catch arm 45 is depressed by cover 11 and the lock pin 42 is in the position shown in FIGS. 69, 19, 27 & 9. The sliding end of the lift arm 41 is fully forward in the slots of the ramp guide 40 and the cylindrical tabs 52 are at the bottom of the ramp portion of the ramp guide 40. The lock pin 42 engages the opening 50 of the lift arm 41 and also engages a notch in the span bar 44. The mechanism is driven forward by the power bar 13 which is driven by a motor and gearbox 15 through a drive mechanism 17. The drive mechanism may consist of a lead screw, cable or cables, plastic tape, or other suitable means, driven by an electric motor and gearbox or a manual hand-crank. The drive mechanism may be selectively attached to the center of the movable cross member (single drive) or to the two ends of the movable cross member (dual cable drive). The explanation of the operation of the Power Vent will assume that the drive mechanism 17 is being driven by an electric motor and gearbox attached to the center of the movable power bar 13. As the Power Vent mechanism approaches the closed position, the lock arm 43 is deflected inboard by the side ramp 46 which is attached to the housing 10 wall as seen in FIGS. 7 and 28. The lock arm 43 pulls the lock pin 42 out, against the bias of spring 62, disengaging the lift arm 41, allowing it to rotate up, and also disengaging the span bar 44, allowing it to slide within the ramp guide 40. The lock arm 43 and lock pin 42 are now in the position shown in FIGS. 7, 20, & 10. At this point the wind deflector assembly 14 will be retracted to its stowed position as seen in FIG. 32 and the sunshade 60 will be free to move into its closed position to shield any light being transmitted through the translucent panel as seen in FIG. 35. At approximately the same time, the rear pinion gears 54 engage the alignment racks 55 insuring that both sides of the roof panel 11 proceed forward evenly. The Power Vent mechanism continues moving forward until the front glider 18 contacts the front stop 48 as seen in FIG. 21. At this point, the forward end of the catch arm 45 is positioned directly above the catch bracket 47 as shown in FIG. 3. Further forward movement of the ramp guide 40 causes the cylindrical tabs 52 to be forced up the ramp portion of the ramp guide 40 until they are resting on top of the ramp portion as seen in FIGS. 20 and 28. In this position, the roof panel 11 will be in the closed position as shown in FIG. 4. A trip mechanism (not shown) will trip a position switch (not shown) at this point and stop the forward movement of the ramp guide 40. In this closed position of panel 11 cylindrical tabs 52 are resting on top of the ramp portion and the inboard cylindrical tab 52 is caught underneath a locking tab 59 attached to the rear glider 16, thus preventing the roof panel 11 from being moved up or down as shown in FIG. 4. If the roof panel 11 is not even with the vehicle roof, it may be adjusted up or down by moving the adjust arm 49 up or down in relation to the lift arm 41 as shown in FIGS. 8 & 11 so that arm 49 comprises means for adjusting the length thereof. Also in this position, the water trough 35 attached to the power bar 13, as shown in FIG. 12, is directly below the gap between the roof panel 11 and the vehicle roof and housing 10 and trough 35 is positioned directly underneath the seal between panel 11 and the roof opening.

Figure 14:
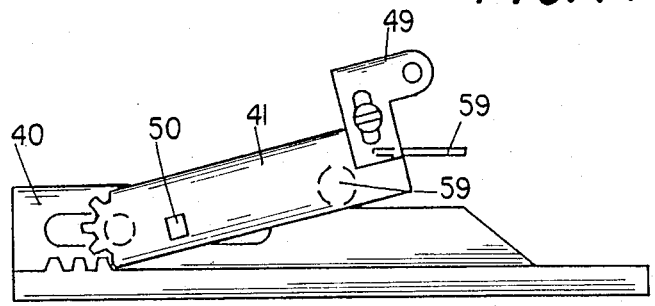
FIG. 14 is a cross-sectional view showing the pinion gear teeth of the lift arm contacting the rack gear teeth of the ramp guide.
Figure 22:
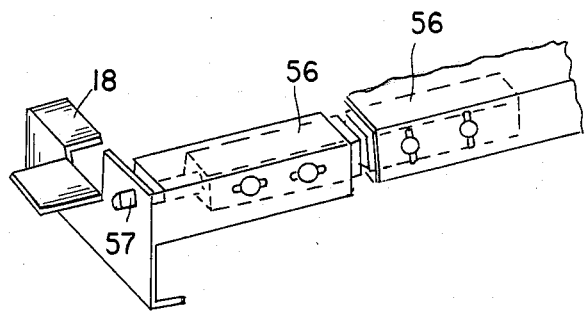
FIGS. 22 and 23 are perspective views of the front pivot block and rod in two different positions.
Figure 23:
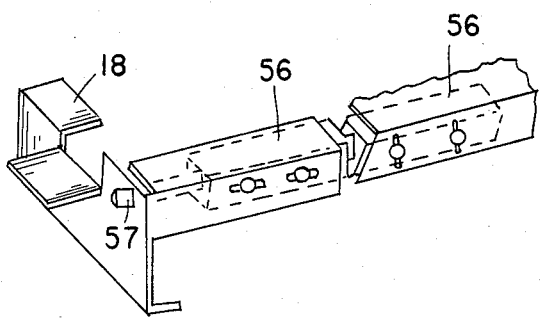

When the operating switch is released and pressed again in the forward direction, the power bar 13 will drive the ramp guide 40 forward again, causing the cylindrical tab 52 to ride along the top of the ramp and the end of the lift arm 41 that is entrapped in the slots of the ramp guide 40 will continue to slide rearward in the slots until the cylindrical tab 52 clears the locking tab 59 on the rear glider 16 and the pinion gear teeth on the lift arm 41 contact the rack gear teeth on the ramp guide 40, as shown in FIG. 14. At this point, the lift arm 41 is free to rotate upward and further forward movement of the ramp guide 40 causes the gear teeth to mesh and rotate the lift arm 41 upward lifting the roof panel 11 into the vent position as shown in FIGS. 5, 21, & 15. Because of the rack and pinion connection between lift arm 41 and guide 40 and because of the connection between guide 40 and gearbox 15, once arm 41 is in the vent position the lift arm and the cover will resist further movement due to the resistance of gearbox 15. As a result, gearbox 15 and the rack and pinion together comprise means for preventing forward movement of the lift arm in the vent position. The roof panel 11 is allowed to rotate upward by means of a front pivot which consists of two front pivot blocks 56 and a front pivot bar 57. One front pivot block 56 is attached to the front glider 18, while the other front pivot block 56 is attached to the roof panel 11. Both front pivot blocks 56 rotate about the front pivot bar 57 as shown in FIGS. 17 & 18 and 22-25, thus allowing the roof panel 11 to rotate in relation to the front glider 18. One of blocks 56 has a horizontally extending opening and the other of blocks 56 has a vertically extending opening therein as illustrated in FIGS. 22 and 23. Screws engage these openings. Depending upon the position of the screws in the openings, panel 11 can be adjusted horizontally or vertically. The upward lift of the roof panel 11 allows the catch arm 45 to rotate downward under the bias of biasing means 64 into the catch bracket 47 which prevents the roof panel 11 from being pulled rearward over the top of the vehicle roof. In order to insure that the roof panel 11 vents straight up and down, a means for adjusting the roof panel's 11 position in relation to the lift arms 41 is provided as shown in FIG. 11. The end of the adjust arm 49 that is attached to the roof panel 11 is threaded so that turning the bolt 51 will move the roof panel 11 laterally with respect to the vehicle roof.

In going from the vent position to the open position, all processes are reversed. The rearward movement of the ramp guide 40 causes the gear teeth to rotate the lift arm 41 downward as seen in FIGS. 14 and 15 until the cylindrical tabs 52 rest on top of the ramp portion and proceed underneath the locking tab 59 of the rear glider 16. At this point the position switch is tripped again causing the rearward movement to stop. Also at this point, the downward movement of the roof panel 11 has deflected the catch arm 45, causing it to rotate clear of the catch bracket 47. When the operating switch is released and pressed again in the rearward direction, the ramp guide 40 continues moving rearward allowing the cylindrical tabs 52 to ride down the ramp portion, and causing the end of the lift arm 41 to ride forward in the slot of the ramp guide 40; when the forward end of the slot is reached, the roof panel 11 is pulled rearward underneath the vehicle roof opening. As it proceeds rearward, the lock arm 43 rides off of the side ramp 46 and pushes the lock pin 42 inward so that it engages the opening 50 in the lift arm 41 and the notch in the span bar 44, thus preventing the roof panel 11 from accidentally lifting while opening or closing.

The mechanism can be operated manually with the following modifications: (1) a handcrank can be used in lieu of a motor, (2) a stop in lieu of a sensing switch to halt the cover in its closed position, which would be disengaged to allow continuing forward travel of the cover to its vent position, and (3) a solid stationary stop can be used in the full vent position in lieu of the second sensing switch.

We claim:

1. A sliding sunroof for a vehicle having an opening in the roof thereof comprising:
   (1) a housing;
   (2) a sunroof cover;
   (3) means for moving forward and rearward;
   (4) means for moving the rear of the sunroof cover upward from an open position to a closed position and further upward to a vent position, and downwardly in the reverse direction in response to movement of said forward and rearward moving means;
   (5) means for securely locking said sunroof in said positions, wherein said sunroof cover moving means further comprises a lifting mechanism, wherein the rear of the sunroof cover is attached to said lifting mechanism, wherein said lifting mechanism comprises a ramp for lifting the cover into said closed position and a rack and pinion gear combination for lifting the rear of the sunroof cover upward into said vent position; and
   (6) a rear cover support means for supporting the rear portion of said cover wherein said lifting mechanism is attached to said rear cover support means, said lifting mechanism comprising:
      (a) a ramp guide comprising:
         (i) a forward end comprising a ramp portion;
         (ii) a slot having a rear portion; and
         (iii) rack gear teeth positioned adjacent said slot; and
      (b) a lift arm slidably encaptured in said slot of said ramp guide wherein said arm comprises:
         (i) means for pivotally attaching said arm to said cover at the forward end of said lift arm;
         (ii) means positioned for riding up said ramp portion of said ramp guide;
         (iii) means for sliding within said slot of said ramp guide; and
         (iv) pinion gear teeth on the rear end of said arm to mesh with said rack gear teeth on said ramp guide.

2. The vehicle sunroof of claim 1 wherein the rear cover support means-lifting mechanism combination further comprises a horizontal locking tab that prevents the riding means on the lift arm from upward movement while said riding means is riding on top of the ramp portion of the ramp guide, thus creating a positive locking means for preventing any vertical movement of the cover while said cover is in the closed position.

3. The vehicle sunroof of claim 1 further comprising a positive lock for preventing the cover from being displaced from said vent position.

4. The vehicle sunroof of claim 1 wherein said pivotally attaching means comprises means of adjusting the length of said pivotally attaching means thereby providing vertical adjustment of the rear of said cover to allow proper positioning of said cover in the closed position.

5. The vehicle sunroof of claim 1 wherein said forward portion of the lift arm further comprises means for horizontally adjusting said cover in the vent position to allow proper venting and closing of said cover.

6. The vehicle sunroof of claim 1 wherein said lifting mechanism further comprises means for locking the lift arm to the ramp guide to prevent the cover from lifting while in the open position, said locking means preventing said lift arm from moving in relation to said ramp guide until said locking means is disengaged prior to said cover moving into the closed position.

7. The vehicle sunroof of claim 6 further comprising:

(6) front cover support means;
(7) a plurality of tracks for guiding said forward and rearward means;
(8) a bar disposed parallel to said tracks; and
(9) bar locking means, wherein said rear cover support means-lifting mechanism combination is slidably attached to said front cover support means by means of said bar, wherein said bar locking means prevents said bar from moving in relation to the rear cover support means-lifting mechanism combination when engaged therewith wherein said bar locking means is disengaged from said rear cover support means-lifting mechanism combination prior to said cover moving from the open into the closed position.

8. The vehicle sunroof of claim 7 wherein said bar locking means locks said bar to said ramp guide, wherein the locking means for locking the lift arm to the ramp guide and the locking means locking the bar to said ramp guide are incorporated into the same locking means.

9. The vehicle sunroof of claim 1 further comprising:
a bracket;
a front cover support means for supporting the front of the cover; and
means for locking said cover in said vent position to prevent said cover from rearward movement in said vent position, wherein said locking means comprises a member pivotally attached to said front cover support means such that when the cover is in the open position, said cover depresses one end of said member, wherein when said cover is moved into the vent position, the other end of said member rotates downward into said bracket, thus creating a positive locking means preventing said cover from moving rearward while in the vent position.

10. The vehicle sunroof of claim 1 further comprising a plurality of connecting bars and a front cover support means for supporting the front of said cover, wherein the front cover support means is attached to the cover by means of said connecting bars rotatably attached thereto thus allowing said cover to rotate about said front cover support means, said connecting bars comprising means for the horizontal and vertical adjustment of said cover thereby allowing for proper positioning of said cover.

11. The vehicle sunroof of claim 1 wherein said cover forms a seal with said opening when said cover is in the closed position, wherein said sunroof further comprises a water trough positioned directly underneath the seal between the cover and the roof opening when said cover is in the closed position.

12. A sliding sunroof for a vehicle having an opening in the roof thereof comprising:
(1) a housing, said housing comprising a plurality of tracks longitudinally positioned along the outer edges of an opening in the housing;
(2) a movable sunroof cover;
(3) rear cover support means for supporting the rear of said cover, wherein said cover support means is slidably attached to said tracks and is adapted to effect open, closed and vent positions of said cover in said roof opening;
(4) a movable cross member;
(5) means for moving said rear cover support means forward and rearward wherein said moving means is applied from the rear of the housing to the rear cover support means through said movable cross member, wherein said movable cross member is separated from and rearward of the cover and attached to said rear cover support means, wherein said forward and rearward moving means is attached to said movable cross member; and
(6) a lifting mechanism, wherein said rear cover support means is attached to the cover through said lifting mechanism, wherein said lifting mechanism is adapted to lift the cover into the closed position flush with the roof opening, and into a vent position above the roof opening, wherein the rear of the sunroof cover is attached to said lifting mechanism, wherein said lifting mechanism comprises a ramp for lifting the cover into said closed position and a rack and pinion gear combination for lifting the rear of the sunroof cover upward into a vent position,
wherein said lifting mechanism comprises:
(a) a ramp guide, and
(b) a lift arm slidably engaged in said ramp guide, wherein said ramp guide comprises;
(i) a ramp portion at the forward end of said guide;
(ii) a slot for slidably engaging said lift arm; and
(iii) rack gear teeth positioned adjacent said slot, wherein said arm comprises:
(i) means for pivotally attaching said arm to said cover at the forward end of said lift arm;
(ii) means positioned to ride up said ramp portion of said ramp guide;
(iii) means for sliding within said slot of said ramp guide; and
(iv) pinion gear teeth on the rear end of said arm to mesh with said rack gear teeth of said ramp guide.

13. The vehicle sunroof of claim 12 wherein the rear cover support means-lifting mechanism combination further comprises a horizontal locking tab for preventing said riding means on the lift arm from upward movement while said riding means is riding on top of the ramp position of the ramp guide, thus creating a positive locking means preventing any vertical movement of the cover while in the closed position.

14. The vehicle sunroof of claim 12 wherein said pinion gear teeth engaging said rack gear teeth in combination with said forward and rearward moving means comprise means for lifting said cover to said vent position and for preventing forward movement of said arm and cover when said cover is in said vent position.

15. The vehicle sunroof of claim 12 wherein, said means for pivotally attaching said cover to said lift arm further comprises an arm and means for adjusting the length of said arm thereby providing vertical adjustment of the rear of said cover to allow proper positioning of said cover in the closed position.

16. The vehicle sunroof of claim 12 wherein said means for pivotally attaching said cover to said lift arm further comprises means for horizontally adjusting said cover in the vent position to allow proper venting and closing of said cover.

17. The vehicle sunroof of claim 12 wherein said lifting mechanism further comprises means for locking the lift arm to the ramp guide to prevent the cover from lifting while in the open position, said locking means preventing said lift arm from moving in relation to said ramp guide until said locking means is disengaged prior to said cover moving into the closed position.

18. The vehicle sunroof of claim 17 further comprising:
 (6) front cover support means;
 (7) a plurality of tracks for guiding said means for moving said cover;
 (8) a bar disposed parallel to said tracks; and
 (9) bar locking means, wherein said rear cover support means-lifting mechanism combination is slidably attached to said front cover support means by means of said bar, wherein said bar locking means prevents said bar from moving in relation to the rear cover support means-lifting mechanism combination when engaged therewith wherein said bar locking means is disengaged from said rear cover support means-lifting mechanism combination prior to said cover moving from the open into the closed position.

19. The vehicle sunroof of claim 18 wherein said bar locking means locks said bar to said ramp guide, wherein the locking means for locking the lift arm to the ramp guide and the locking means locking the bar to said ramp guide are incorporated into the same locking means.

20. The vehicle sunroof of claim 12 further comprising:
 a bracket;
 a front cover support means for supporting the front of the cover; and
 means for locking said cover in said vent position to prevent said cover from rearward movement in said vent position, wherein said locking means comprises a member pivotally attached to said front cover support means such that when the cover is in the open position, said cover depresses one end of said member, wherein when said cover is moved into the vent position, the other end of said member rotates downward into said bracket, thus creating a positive locking means preventing said cover from moving rearward while in the vent position.

21. The vehicle sunroof of claim 12 further comprising a plurality of blocks and a front cover support means for supporting the front of said cover, wherein the front cover support means is attached to the cover by means of said blocks rotatably attached thereto thus allowing said cover to rotate about said front cover support means, said blocks comprising means for the horizontal and vertical adjustment of said cover thereby allowing for the proper positioning of said cover.

22. The vehicle sunroof of claim 12 wherein said cover forms a seal with said roof opening when said cover is in said closed position, wherein said sunroof further comprises a water trough attached to the front of the movable cross member such that said water trough is positioned directly underneath said seal between the cover and the roof opening when said cover is in the closed position.

23. The sunroof of claim 12 further comprising:
 a sunshade, slidably attached to said tracks and adapted to effect open and closed positions, positioned underneath said sunroof cover; and
 a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

24. The sunroof of claim 12 further comprising:
 a sunshade, slidably attached to said tracks and adapted to effect open and closed positions, positioned underneath said sunroof cover; and
 a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

25. The sunroof of claim 13 further comprising:
 a sunshade, slidably attached to said tracks and adapted to effect open and closed positions, positioned underneath said sunroof cover; and
 a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

26. The sunroof of claim 14 further comprising:
 a sunshade, slidably attached to said tracks and adapted to effect open and closed positions, positioned underneath said sunroof cover; and
 a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

27. The sunroof of claim 15 further comprising:
 a sunshade, slidably attached to said tracks and adapted to effect open and closed positions, positioned underneath said sunroof cover; and
 a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

28. The sunroof of claim 16 further comprising:
 a sunshade, slidably attached to said tracks and adapted to effect open and closed positions, positioned underneath said sunroof cover; and
 a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

29. The sunroof of claim 17 further comprising:
 a sunshade, slidably attached to said tracks and adapted to effect open and closed positions, positioned underneath said sunroof cover; and
 a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

30. The sunroof of claim 18 further comprising:
a sunshade, slidably attached to said tracks and adapted to effect open and closed positions, positioned underneath said sunroof cover; and
a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

31. The sunroof of claim 19 further comprising:
a sunshade, slidably attached to said tracks and adapted to effect open and closed positions, positioned underneath said sunroof cover; and
a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

32. The sunroof of claim 20 further comprising:
a sunshade, slidably attached to said tracks and adapted to effect open and closed positions, positioned underneath said sunroof cover; and
a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

33. The sunroof of claim 21 further comprising:
a sunshade, slidably attached to said tracks and adapted to effect open and closed positions, positioned underneath said sunroof cover; and
a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

34. The sunroof of claim 22 further comprising:
a sunshade, slidably attached to said tracks and adapted to effect open and closed positions, positioned underneath said sunroof cover; and
a wind deflector positioned at the front of the housing such that said wind deflector is contained within said housing when the cover is in the closed position, and wherein said wind deflector is adapted to move upward when said cover is in the open position, to deflect the wind over the top of the roof opening and to prevent wind noise and interior air turbulence and drafts.

35. The vehicle sunroof defined by claim 1 further comprising;
means for maintaining the cover in a squarely aligned position, said alignment means comprising:
(i) a plurality of tracks;
(ii) a movable cross member;
(iii) rack gear teeth; and
(iv) a pair of pinion gears fixedly attached to each other wherein each pinion gear is, rotatably attached to the rear of said movable cross member, and wherein said pair of pinion gears meshes with said rack gear teeth, wherein said rack gear teeth are fixably attached to the top of said tracks.

36. The vehicle sunroof of claim 1 further comprising:
a first stop means for engaging said cover to prevent movement of said sunroof cover when said sunroof cover is in said closed position; and
means for disengaging said cover from said stop means to permit said cover to move into said vent position.

37. The vehicle sunroof defined by claim 36 further comprising:
a second stop means for preventing movement of said cover in said vent position.

* * * * *